United States Patent [19]

Pettis et al.

[11] Patent Number: 5,212,794
[45] Date of Patent: May 18, 1993

[54] METHOD FOR OPTIMIZING COMPUTER CODE TO PROVIDE MORE EFFICIENT EXECUTION ON COMPUTERS HAVING CACHE MEMORIES

[75] Inventors: Karl W. Pettis, San Jose; Robert C. Hansen, Santa Clara, both of Calif.

[73] Assignee: Hewlett-Packard Company, Palo Alto, Calif.

[21] Appl. No.: 531,782

[22] Filed: Jun. 1, 1990

[51] Int. Cl.$^5$ .................. G06F 9/445; G06F 9/45
[52] U.S. Cl. .................. 395/700; 364/DIG. 1; 364/280.4; 364/280.5; 364/243.4; 364/243.41; 364/243.42; 364/261.3; 364/261.4; 364/261.5; 364/262.5; 364/264.4; 364/267.4; 371/19
[58] Field of Search .................. 364/DIG. 1, DIG. 2; 395/700; 371/19

[56] References Cited

U.S. PATENT DOCUMENTS

| | | | |
|---|---|---|---|
| 3,702,005 | 10/1972 | Ingalls, Jr. | 395/575 |
| 3,800,291 | 3/1974 | Cocke et al. | 395/400 |
| 4,435,758 | 3/1984 | Lorie et al. | 395/800 |
| 4,782,444 | 11/1988 | Munshi et al. | 395/700 |
| 4,847,755 | 7/1989 | Morison et al. | 395/650 |
| 4,881,170 | 11/1989 | Morisada | 395/375 |
| 4,965,724 | 10/1990 | Utsumi et al. | 395/700 |
| 4,991,080 | 2/1991 | Emma et al. | 395/375 |
| 4,991,088 | 2/1991 | Kam | 395/425 |
| 5,021,945 | 6/1991 | Morrison et al. | 395/375 |
| 5,103,394 | 4/1992 | Blasciak | 395/575 |
| 5,142,679 | 8/1992 | Owaki et al. | 395/700 |

OTHER PUBLICATIONS

Hwu, W. and Chang, P.; Achieving High Instruction Cache Performance with an Optimizing Compiler; 1989, pp. 242-251.
Samples A. and Hilfinger, P.; Code Reorganization for Instruction Caches; Oct. 1989, pp. 1-25.

*Primary Examiner*—David L. Clark
*Assistant Examiner*—Matthew C. Fagan
*Attorney, Agent, or Firm*—Alan H. Haggard; Roland I. Griffin

[57] ABSTRACT

The method uses statistical information obtained by running the computer code with test data to determine a new ordering for the code blocks. The new order places code blocks that are often executed after one another close to one another in the computer's memory. The method first generates chains of basic blocks, and then merges the chains. Finally, basic blocks that were not executed by the test data that was used to generate the statistical information are moved to a distant location to allow the blocks that were used to be more closely grouped together.

6 Claims, 5 Drawing Sheets

METHOD FOR OPTIMIZING COMPUTER CODE TO PROVIDE MORE EFFICIENT EXECUTION ON COMPUTERS HAVING CACHE MEMORIES

BACKGROUND OF THE INVENTION

The present invention relates to computer systems and, more particularly, to an improved method for generating computer code which executes more efficiently on computers having cache memories and the like.

Conventional computing systems include a central processing unit which executes instructions which are stored in a memory. The cost of providing higher speed central processing units has decreased much faster than the cost of computer memory. This decrease in cost at the central processing level has resulted from such innovations as reduced instruction set architectures and instruction pipelining. Similar advances have not taken place in memory circuitry. In addition, the size of computer programs has increased as more complex tasks are set-up for computer implementation. This increased program size further aggravates the central processor memory mismatch.

One solution to the mismatch between central processing speed and the cost of computer memory having comparable speed is the introduction of intermediate memory units. Small high speed cache memories are placed between the central processing unit and the computer's main memory. The cache memory has a speed which is comparable to that of the central processing unit; hence, instruction fetches from the cache do not introduce processing delays. The size of the cache is much less than that of the main memory; hence, the cost of a slow main memory and a cache is much less than a main memory having the speed of the central processing unit.

When the central processing unit requests an instruction, the request is intercepted by the cache. If the instruction in question is already stored in the cache, it is returned to the central processing unit. If the instruction is not present, the cache loads a small block of memory locations which includes the requested instructions from the main memory. The cache then returns the requested instruction. The need to load the small block, referred to as a "line", delays the execution of the program; hence, such cache loads must be limited to a small fraction of the instruction fetches if the cache architecture is to provide a substantial speed enhancement. This will be the case if the computer code is organized such that the execution sequence of the code is the same as the storage sequence. That is, if instruction A is to be executed after instruction B, instruction B should be stored immediately after Instruction A. In this case, each instruction in each line of code will be executed in the order stored and cache loads will only be needed at the end of each line of code. Furthermore, the cache loads at the end of lines could then be anticipated in advance and thus performed before the lines in question were actually requested.

The presence of JUMP instructions in the computer code results in difficulties in providing this ideal code organization. When the central processing unit encounters a JUMP instruction, the next instruction will be at a point in the code which may be very distant from the location at which the JUMP instruction is stored. Hence, the cache may not contain the line which includes the next instruction. Furthermore, if the JUMP instruction is a conditional one, there is no method of determining in advance whether or not the jump will be executed.

JUMP instructions cause additional problems for pipelined central processing units. In a conventional pipelined processor, a number of instructions are being processed at any given time. Each time an instruction is executed, a new instruction is introduced into the "pipe". If a jump is executed, the next instruction in the pipe is not likely to be the target of the jump. Hence, a portion of the pipe must be emptied and reloaded starting with the target instruction. Hence, computer code which minimizes the use of JUMP instructions is highly desirable.

Broadly, it is the object of the present invention to provide an improved computer code optimization method It is another object of the present invention to provide a code optimization method that places code blocks which are executed in sequence in memory locations which are close to each other.

It is yet another object of the present invention to provide a code optimization method that reduces the number of JUMP instructions in the executed computer code.

These and other objects of the present invention will become apparent to those skilled in the art from the following detailed description of the invention and the accompanying drawings.

SUMMARY OF THE INVENTION

Figure 1:
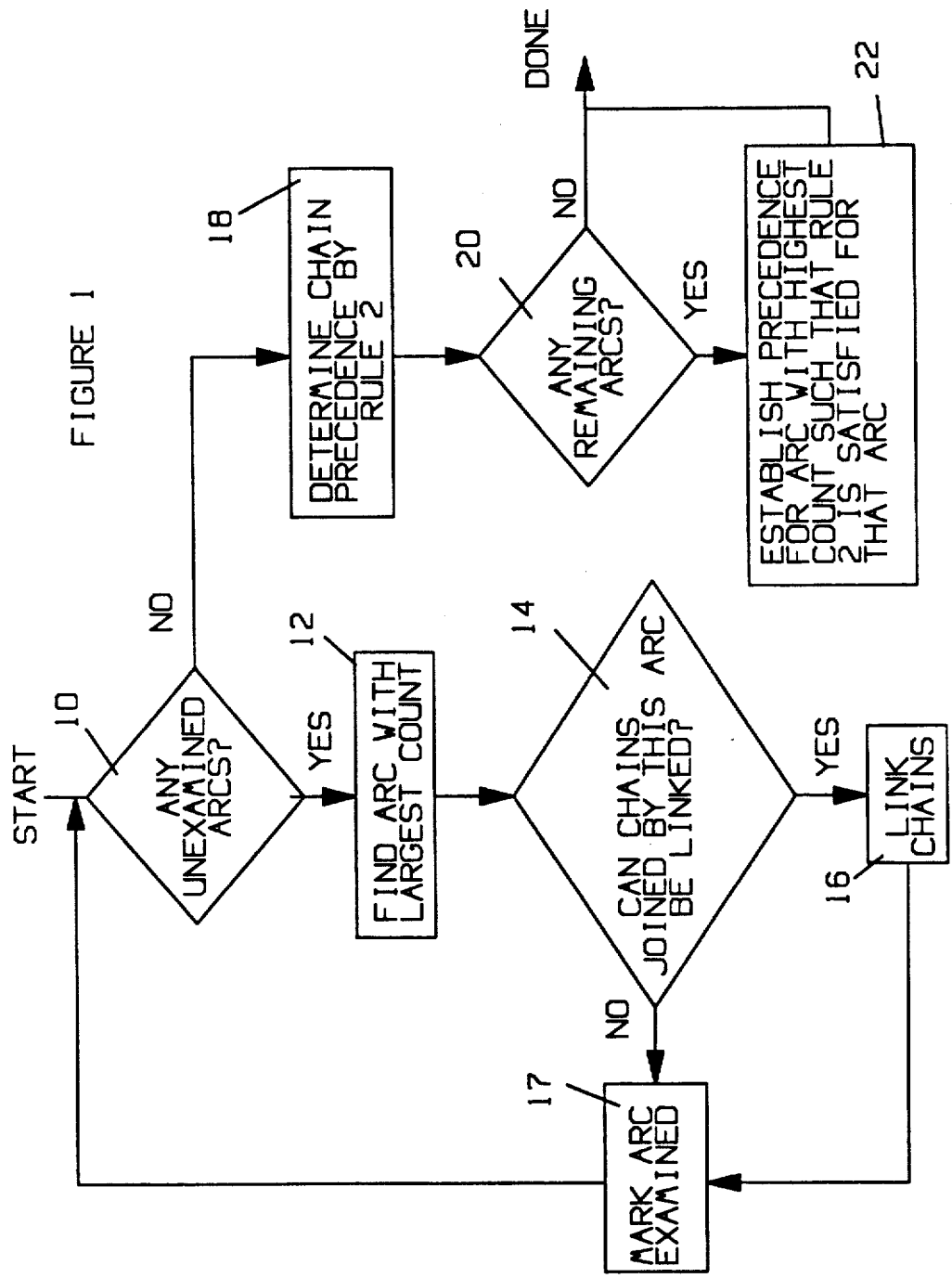
FIG. 1 is a flow chart for a basic block positioning method according to the present invention.

The present invention comprises a code optimization method for providing more efficiently executable computer code for running on a computer system having cache memories and the like. The method uses statistical information obtained by running the computer code with test data to determine a new ordering for the code blocks. The new order places code blocks that are often executed after one another close to one another in the computer's memory.

In one embodiment of the method of the present invention a first computer program is converted to a second computer program. The first computer program comprising a set of basic blocks of computer code arranged in a first linear order, and the second computer program comprises a second set of basic blocks in a second linear order, each basic block of said second set of basic blocks corresponding to a basic block of said first set of basic blocks. The method first determines the frequency with which each basic block of said first set of basic blocks transfers control to each other basic block of said first set of basic blocks when said first computer program is executed with predetermined test data. An indicator is provided for each said pair of basic blocks having a determined transfer frequency greater than zero, said indicator having a first state indicating that said pair of basic blocks has not been examined and a second state indicating that said pair of basic blocks has been examined. The indicators are initialized to the first state. The pair of basic blocks for which said indicator is in said first state having the largest transfer frequency is then determined and said indicator set to said second state. A pair of chains, each comprising one or more basic blocks, is combined if the source basic block for the selected pair of chains is the tail of one of said chains and the target block is the head of the other of said chains, said source and target basic comprising said pair of basic blocks. The combining steps are repeated until all said indicators are in said second state. The chains are then arranged in a linear order to form said second computer program.

In a second embodiment of the present invention, a computer program comprising a plurality of procedures is modified to cause the computer program to be loaded in a more efficient memory order by determining the frequency with which each said procedure calls each other said procedure in said computer program and placing the procedures in the computer's memory in an determined by said determined frequencies.

DETAILED DESCRIPTION OF THE INVENTION

The present invention utilizes two passes to optimize the computer code. In the first pass the code is compiled and special code inserted which collects statistics on the subsequent execution of the code. This special code will be referred to as the instrumentation code in the following discussion. The instrumented code is then executed using representative test data. During the execution, the instrumentation code records data indicating the number of times each block transfer control to the other blocks in which various blocks of code were actually used. In the second pass, this data is used to reorder the code such that instructions that are often executed after one another are stored close to one another in memory. The reordering operation also eliminates a significant number of JUMP instructions in the portion of the code which is most frequently executed, thereby reducing the program size and further improving the efficiency with which the code is executed.

The smallest unit of computer code that is moved by the method of the present invention will be referred to as a basic block. A basic block is defined to be a straight line section of code with a single entry point at the beginning and a single exit point at the end. The basic block was chosen as the smallest entity to move because once a basic block is entered, it is guaranteed that all of the instructions for that block will be executed in order. Hence, no further improvement in cache loading can be obtained by reordering the code within the basic block.

Basic Block Positioning

Within most computer programs, there are control flow paths and basic blocks that are seldom executed during typical program runs. Conventional compilers generate code in a manner in which these rarely used sections of code are interspersed with frequently used sections. For example, consider the code for an error check in the form:

If (test for error) then (handle error case) (remaining code)

When this code is compiled, the compiler typically places the code for the error test at the end of a basic block with a conditional branch around the code to handle the unusual situation. In the normal case, there is no error, and the branch is usually taken. As a result, not all the instructions in the cache line containing the branch instruction, or the cache line containing the target, will be executed. Incompletely using some cache lines results in the total number of cache lines used being higher than would be expected from the number of instructions actually executed.

In addition, on pipelined computers, the hardware often predicts that forward conditional branches will not be taken and that backward conditional branches will be taken. For the code generated in this example, the prediction for the forward branch is usually incorrect. This leads to wasted cycles resulting from the need to reload the pipeline. The deeper the pipeline, the larger the penalty.

The present invention identifies such cases and moves the infrequently executed code away from the more frequently executed code so that the normal flow of control is in a straight-line sequence. The target and sense of the conditional branch are changed to reflect the new ordering of the code. As a result, longer sequences of code are executed before a branch is taken. Thus, on average, the number of instructions executed per cache line increases, and there are fewer caches misses. Furthermore, branch penalties are reduced since the hardware prediction matches normal code execution. Finally, in some cases, moving the infrequently executed code results in the elimination of an unconditional JUMP instruction.

When the code is instrumented in the first pass, a small block of code is added to each basic block for each possible transfer to that basic block. This code will be referred to as a basic block stub in the following discussion. When the compiler encounters a JUMP instruction, it transfers to the target of the JUMP instruction and inserts a basic block stub. The basic block stub comprises storage space for a counter used to record the number of times the jump is executed, data specifying the source of the JUMP instruction, and a JUMP instruction to the beginning of the basic block. A basic block stub is inserted for each possible JUMP instruction having the basic block in question as its target. The counters are initialized to zero by the linkage editor prior to the execution of the code with the test data.

After the code has been execute with the test data, the present invention examines the basic block stubs and constructs a graph having arcs showing the various jumps and the number of times each JUMP instruction was executed. The code is then reordered.

The reordering combines basic blocks into chains. A chain is defined to be a sequence of basic blocks that should be a contiguous section of straightline code. A source basic block is defined to be a basic block ending in a branch instruction such as a Jump. A target basic block is defined to be the basic block which begins with the target of a branch instruction. It should be noted that every basic block is a target of some other basic block, and every basic block is also a source basic block in a computer program running under a standard operating system.

Three rules are used to construct chains. First, two chains can be merged if the source basic block for the selected arc is the tail of a chain and the target block for the selected arc is the head of a chain. Since all basic blocks are themselves chains, this rule will always be true for the first arc selected.

Second, if the source of the arc is not a tail of a chain or the target of the arc is not a head of a chain, then the chains are not merged. However, such arcs are used to define a precedence relation among the chains. The precedence relationships are used to guide the final placement of the chains. When two chains cannot be merged, the chain containing the source is given precedence over the chain containing the target if the chain containing the source basic block consists of a conditional branch to a target basic block in the second chain.

If the source basic block for the current arc contains a conditional branch, then the current arc contains one of the two possible targets. If the source is not the tail of a chain, then the source has already been chained with the second of the possible targets. Since arcs are examined in the order of the frequency of use from most frequently executed to least frequently executed, the source basic block in question will have already been chained with the dominant target. On pipelined machines, the lesser taken path of a conditional branch should be a forward branch in order to avoid penalties resulting from incorrect branch prediction. Thus, since the most common target basic block for the branch has already been chained to the branch, the target for the current arc should be a forward branch from the branch point. This is the rationale behind giving the chain containing the source node precedence over the chain containing the target node As will be discussed in detail below, the above mentioned two rules do not always resolve the ordering of all of the basic blocks. If there are any chains for which a precedence relationship has not been specified by the second rule, a third rule is applied. The third rule establishes the precedence of remaining chains by giving precedence to a chain currently lacking precedence if this would result in the second rule being satisfied for the arc having the largest count.

FIG. 1 is a flow chart for the basic block positioning method as described above. The method examines each of the arcs in the graph. If any arc has not been examined, the method finds the arc having the largest count among the unexamined arcs as shown at 10 and 12. The method then attempts to join the two chains connected by this arc as shown at 14. If the two chains can be linked then they are linked as shown at 16. The arc is then removed. If the two chains can not be linked, the arc is merely marked as being examined and the next unexamined arc is found.

When all of the arcs have been examined, the program applies the second rule to establish precedence between any remaining chains as shown at 18. If there are any remaining arcs, the method then attempts to remove them by satisfying the second rule for the arc having the largest count.

Figure 2:
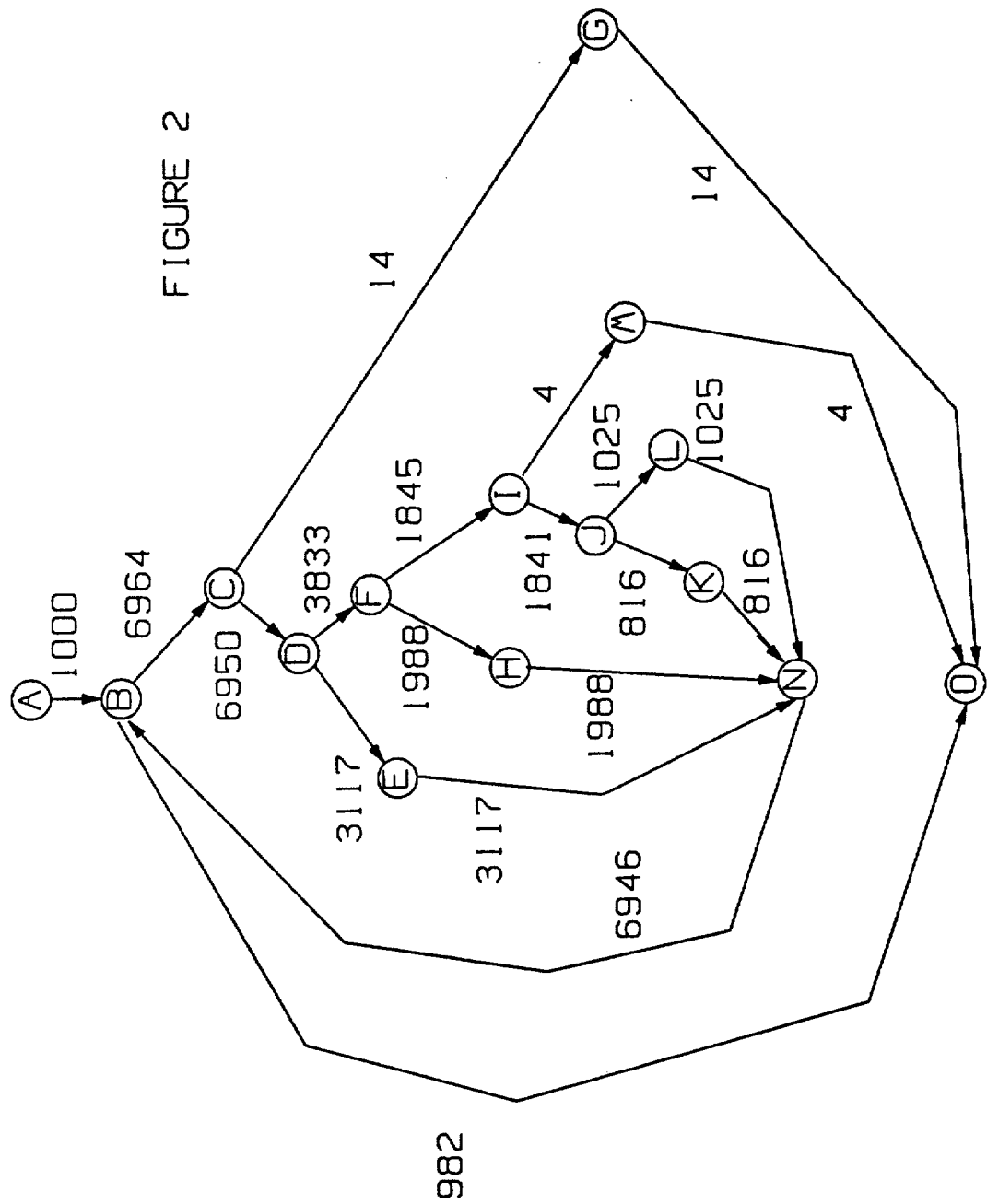
FIG. 2 illustrates the basic block positioning method of the present invention with reference to a specific example.

This reordering operation may be more easily understood by considering a simple example. FIG. 2 shows the basic block graph of a procedure with each arc labeled with its count as determined in a test run. The source code was a while loop written in the C language. Within the body of the loop were several if-then-else tests along with two alternate break statements at basic blocks G and M. The reordering starts by finding the arc with the highest count which is the arc from basic block B to C (count =6964) and joining these two together into a chain. The next largest arc (6950) from basic block C to D is then found. Since basic block C is at the end of a chain, the B-C chain can be extended to include D. The next three largest arcs (N-B, D-F, and E-N) also extend the existing chain. The next largest arc (D-E) can not be used to extend a chain, since basic block D is already in the middle of a chain. The process is repeated with the remainder of the arcs. The final result will be six chains, three of which being individual basic blocks:

```
1) A
2) E-N-B-C-D-F-H
3) I-J-L
4) G-O
5) K
6) M
```

After the chains have been formed, a precedence relation is attempted between them based on the desire to have non-taken conditional branches be forward. There are 6 conditional branches in this procedure. The second rule discussed above prescribes that chain 2 containing B-C should occur before chain 4 containing 0. If these two chains are placed in this order, then the less frequently executed path out of B is the forward branch as desired.

The other conditional branches at C,F, I and J imply that the following order among the chains:

| chain 2 (C) | before | chain 4 (G) |
| chain 2 (F) | before | chain 3 (I) |
| chain 3 (I) | before | chain 6 (M) |
| chain 3 (J) | before | chain 5 (K) |

There still remains one conditional branch left at D. Hence, the second rule will not always provide a complete set of precedence relationships. As noted above, it is preferred that the branch which is less frequently taken be forward. Hence, the branch from D to E should be forward (since that link is not taken as often as the path from D to F). But since E and D are part of the same chain, and E occurs before D in the chain, that branch is necessarily backwards. In other examples, it sometimes happens that the precedence relation between chains is not transitive. In these cases the reordering method resolves such conflicts by looking at the weights of the arc and choosing an order that will satisfy the precedence of the arcs having the higher weight.

After the precedence criteria are determined between chains, the chains are arranged so that the order is satisfied consistent with the above rules. If there is some freedom in choosing the next chain, the chain connected to existing chains by the heaviest count is chosen. In this example, the final order of the basic blocks is:

A, E-N-B-C-D-F-H, I-J-L, G-O, K, M

An alternative ordering method which is less optimum then the one described above may also be used. In the alternative method, the chains are started with the entry point basic block. At each point, the computer tries to place a successor of the last placed basic block.

If there is more than one available, the one with the higher arc count is chosen. In this example, the method starts with basic block A. It only has one successor, B, so that would be placed next. B has two successors, but C is connected with the higher arc count so it would be chosen next. Continuing in this way, blocks D, F, H and N are placed.

After N is chosen, its only successor has already been selected, so a new starting place must be chosen from among the unselected basic blocks. In this example, E is selected since it is connected to the already chosen blocks by a weight of 3117. Note that its only successor has also already been chosen; hence, another new starting point is needed. The computer starts again with an unselected block, I. The final order after the algorithm completes is A, B, C, D, F, H, N, E, I, J, L, 0, K, G, and M.

Both of the above methods do a good job of making conditional branches into forward branches that are usually not taken. However, the first method has the added advantage of removing unconditional branches. Hence, the first method is the preferred embodiment of the present invention.

After a new ordering of the basic blocks has been established, the frequently executed basic blocks (primary basic blocks) are now found toward the top of the procedure while the infrequently executed blocks are found near the end. Basic blocks that were never executed according to the collected profiling data will be referred to as fluff. The fluff ends up at the very end of the procedure.

Although this ordering and rearrangement of the code is a significant improvement over that generated by the compiler, there is still room for further improvement. In particular, the code would execute more efficiently if the fluff were moved to a distant location thereby allowing all of the primary basic blocks to be grouped together. This separation process is referred to as procedure splitting since it results in part of the code in a given procedure being relocated to a remote area of memory.

Procedure Splitting

Procedure Splitting is the process of separating the fluff basic blocks of a procedure into a separate secondary region of the main memory to minimize the size of the primary part of the procedures. By producing a smaller and denser primary procedure, more primary parts of procedures can now be packed into a single memory page. Hence a reduction in the working page set size is often obtained. This is a significant advantage of the present invention on computers which utilize virtual memory systems.

Virtual memory systems are analogous to the main memory-cache memory arrangement discussed above. In this case, the slow memory usually consists of a disk drive, and the fast memory consists of the computers main memory. Large programs are stored on the disk. As the instructions are needed, a portion of the program, referred to as a page, is read from the disk into the main memory of the computer. A page, in turn, consists of a plurality of lines which are read into the cache memory prior to execution by the central processing system. By reducing the number of pages needed to store the commonly used code, the number of times the desired page is not already in memory when requested is reduced. By moving the fluff, fewer pages are needed to hold the working sections of the program.

Figure 3:
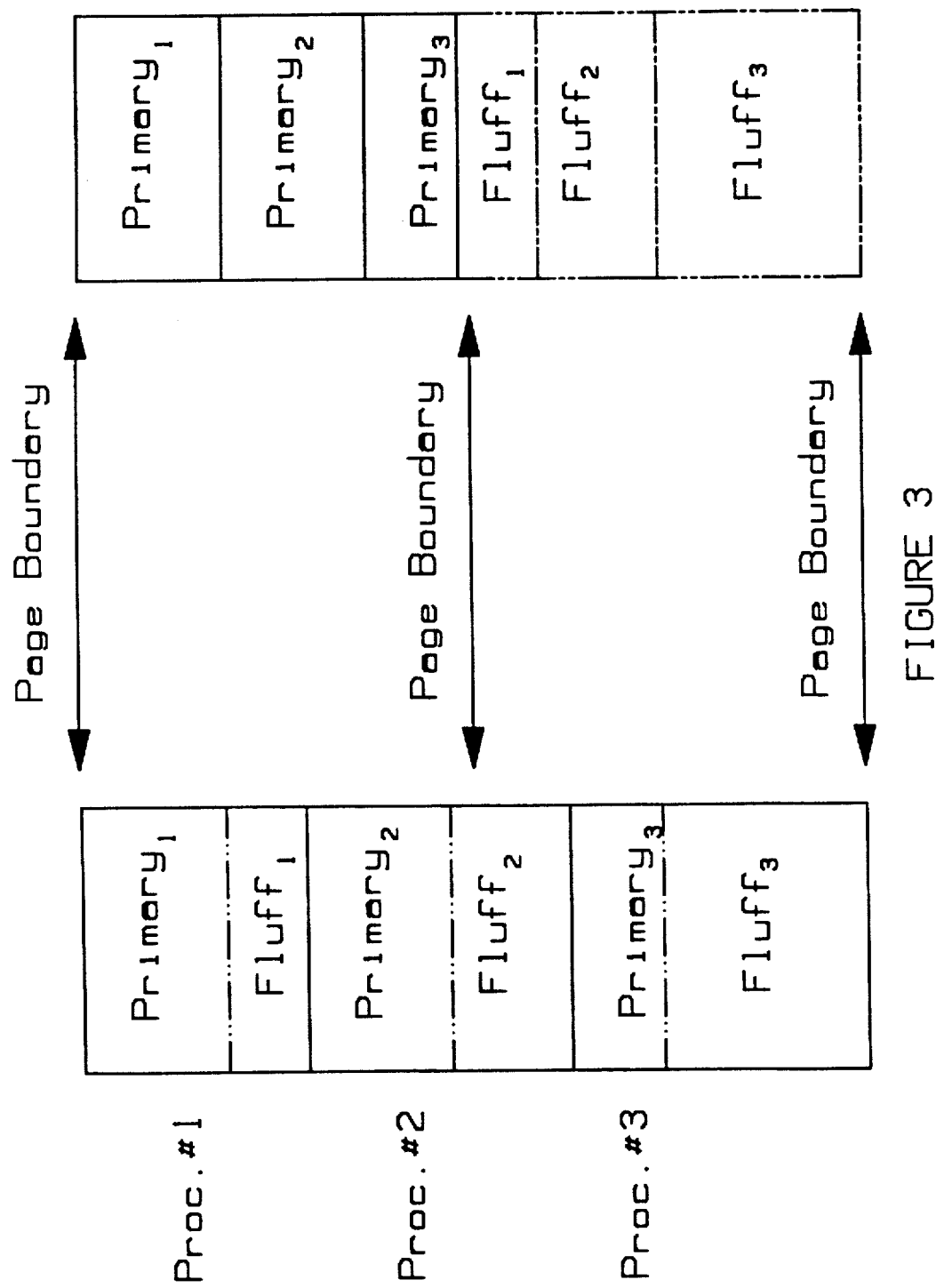
FIG. 3 illustrates the benefits obtained by splitting procedures.

FIG. 3 shows an example of three procedures that would normally require two pages of memory. By splitting the primary portions away from the fluff, the primary code for the procedures can be contained within a single page.

When separating the fluff basic blocks from the primary blocks for a given procedure, a new procedure is defined to encompass the fluff blocks. This procedure is atypical in that it does not adhere to the standard procedure calling conventions. There are no defined entry or exit points and no register saves or restores. This method was selected to avoid the overhead associated with a standard procedure call whenever control transfers between a primary and fluff procedure. The new procedure is also given a higher sort key so that the linker will force all fluff procedures to the end of the program space.

After it has been determined which basic blocks will be moved into the fluff procedure, any branch that goes from a primary basic block to a fluff basic block, or vice-versa, is redirected to a long branch. A "long branch" is a JUMP instruction whose target may be more than a predetermined distance from the JUMP. Long branch instructions take longer to execute, and hence, are normally avoided. However, these instructions are less of a problem in the present invention, since they are only rarely executed. The target of the long branch will be the original target basic block. A long branch is used because eventually the fluff procedure will most likely be located too far from its primary counterpart to be accessed by a short branch instruction.

These branches are allocated at the end of the procedure that is doing the interprocedural branch. Placing the branch at the end of the procedure instead of converting the original branches into long branches was chosen for simplicity. If there are multiple branch sites which have the same branch target, a single long branch is shared to save space.

Since the paths between primary and fluff code were never taken according to the representative profiling data, the long branches should be infrequently executed and only for atypical inputs.

Figure 4B:
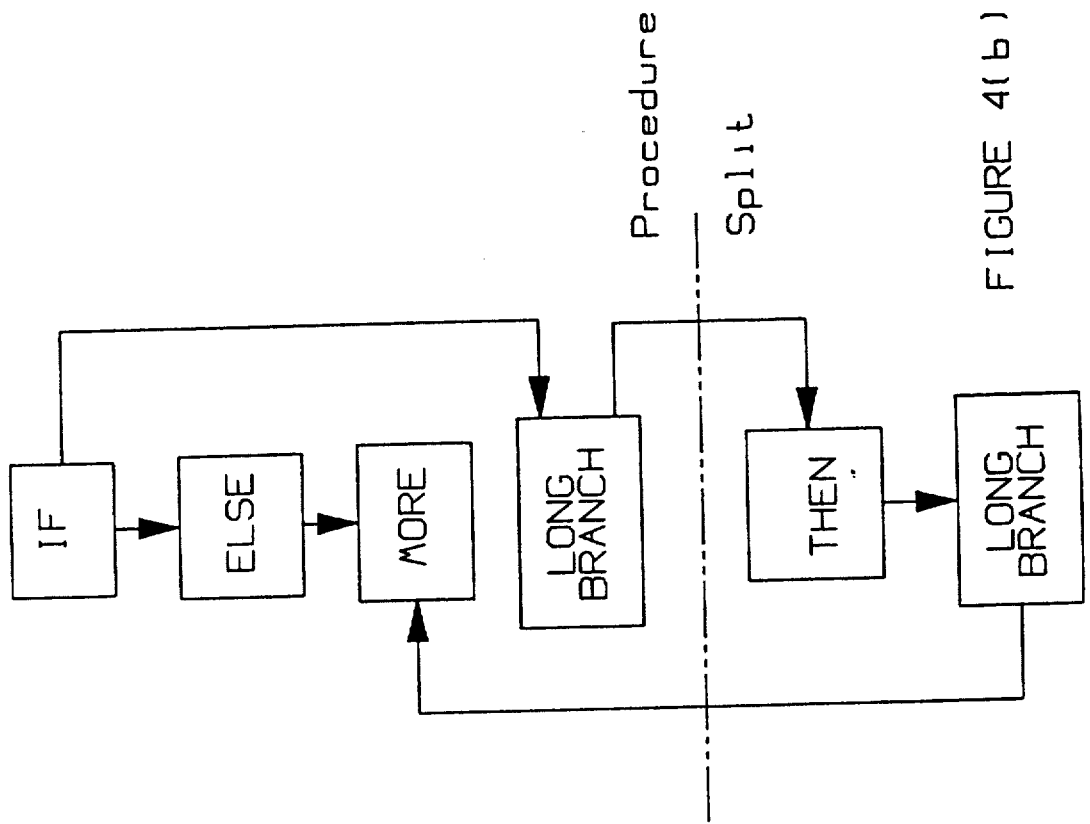
FIG. 4(b) shows the ordering after Procedure Splitting has been applied.
Figure 4A:
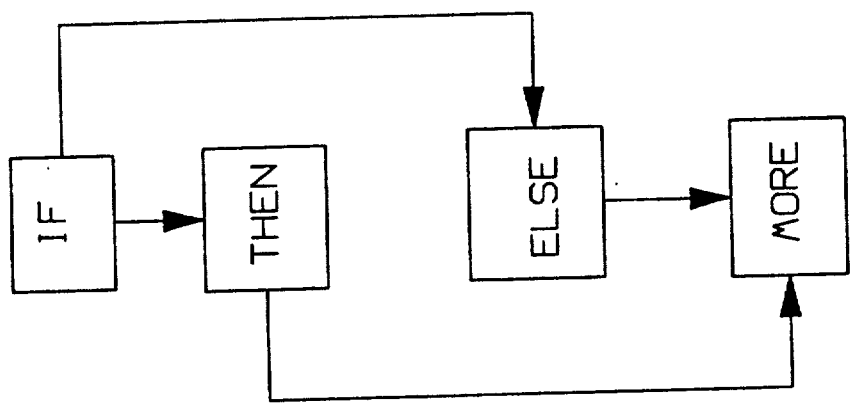
FIG. 4(a) shows the traditional ordering of basic blocks.

An example of an if-then-else sequence where the then clause is considered to be fluff is shown in FIG. 4(a)-(b). FIG. 4(a) shows the traditional ordering of basic blocks. FIG. 4(b) shows the ordering after Procedure Splitting has been applied.

The procedure splitting method of the present invention has been described with respect to basic blocks which were not utilized by the program while running the test data. However, it will be apparent to those skilled in the art that any basic block which had a frequency of utilization less than some predetermined frequency could be moved in the same manner.

Procedure Ordering

In the preferred embodiment of the present invention, yet another layer of code optimization is utilized. The above described basic block reorganization is preferably performed on basic blocks within a single procedure. Most computer programs consist of a plurality of procedures. Hence, in the preferred embodiment of the present invention, the reordering process is also performed at the procedure level.

This separation is made because the compiler normally has access to the basic blocks within a procedure but can only be assumed to have the code for a single procedure available at any given time. The linkage editor, on the other hand, has access to the code generated by the compiler for all of the procedures, but does not have the code for basic blocks in a form which is convenient for inserting the instrumentation code.

In the preferred embodiment of the present invention, the procedure ordering is implemented in a separate set of passes. The first step in ordering the procedures is to construct a weighted call graph using the data collected by the instrumentation code. The linker introduces the procedure instrumentation code in a manner analogous to that described above for the basic blocks. The instrumentation is setup by the linker because only the linker is assured of having access to all procedures at the same time. The basic instrumentation code is similar to that described above with reference to the basic block, and hence, will not be described in detail here. For the purposes of this discussion it is sufficient to note that a table is setup having a counter for each combination of calling and called procedure as is done for source and target basis blocks. Since the linkage editor already has a table giving the location of all calls and the procedure called, this is a straight forward extension of a conventional linkage editor. This table is initialized by the linker prior to running the program with the sample test data.

After running the program, a call graph is constructed. Initially, each node of the graph is a single procedure and the edges correspond to calls between the procedures. The edges are weighted by the number of times the calls were actually made. If a procedure calls another from several different places within itself, or if two procedures were mutually recursive, those weights are first summed together to form the edge weight shown in the graph.

Broadly, the method of the present invention places procedures in memory based on the frequency with which said procedures called each other when executing the test data. The linkage placement of the procedures is determined by constructing groups similar to the chains described above with reference to basic blocks. However, the rules for ordering of the groups are somewhat different. Initially each group consists of one of the nodes in the call graph. The link order is constructed by first choosing the edge with the heaviest weight. The two nodes connected by this edge will be placed next to each other in the final link order to form a new group. However, the precedence of one node over the other in the group is not determined at this stage. This node will be referred to as an incompletely determined node. The two nodes are merged into a single node or group having two procedures therein, and the remaining edges leaving each node are coalesced.

This process is repeated until the two nodes being combined include at least one node that consists of an incompletely determined node. At this point, the nodes are combined, and the order of the various procedures in the node is determined. The order is determined by first making a list of the possible orders. Those entries in the list that place procedures next to one another that were not linked in the original call graph are then removed from the list. If there is more than one possible order left, the one which places procedures closest to each other that had the highest count connecting them in the call graph is used. Once the order has been determined, the linked procedures in the node are treated as a single "procedure" or an incompletely determined node in the remaining steps. The process is repeated until the resulting graph consists of an individual node or nodes with no edges.

Figure 5B:
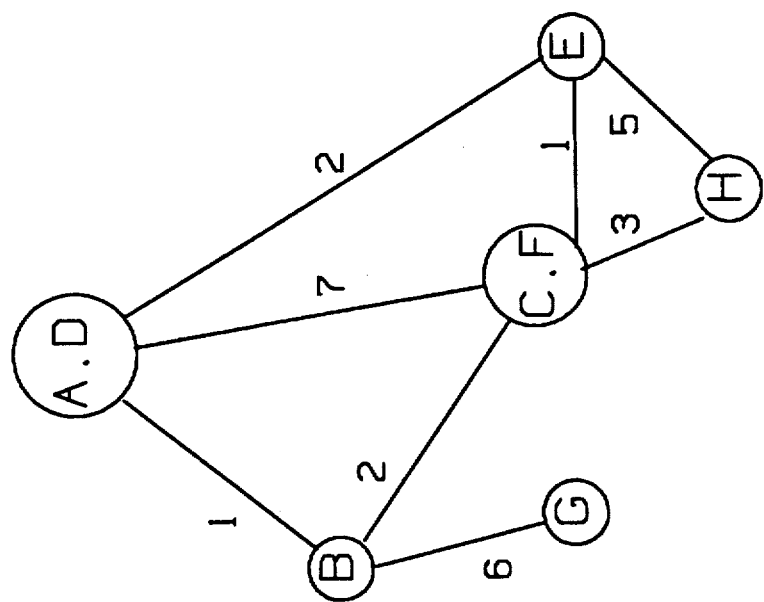
FIGS. 5(a) and 5(b) illustrate the manner in which procedures are ordered according to the present invention.
Figure 5A:
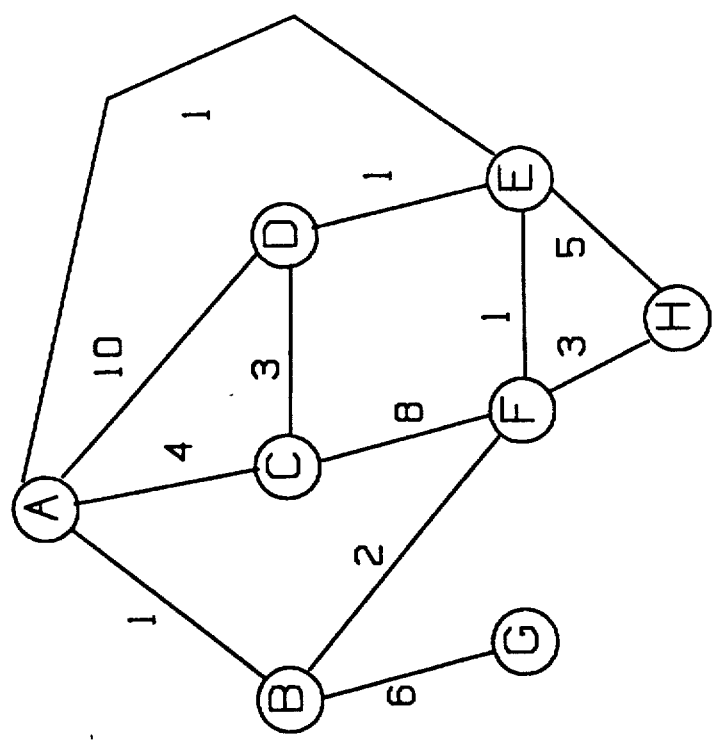

An example of this process is shown in FIG. 5. FIG. 5(a) shows the graph prior to any mergers. The edge with the highest weight is the one connecting procedures A and D. Hence, procedures A and D will be placed next to each other in the final link order. However, the precedence of A and D will not be decided until later in the process. The two nodes are then merged and the process repeated. The next edge will be the one between procedures C and F. Again, it is determined that C and F will be placed next to one another in the final link order; although it is not known which will come first. After nodes C and F are merged, the graph will appear as shown in FIG. 5(b).

The next highest weight is that between the two nodes that were just built by the previous mergers. Since it has already been decided that A and D should be together and that C and F should be together, there are four distinct choices available for ordering of this next merger:

(1) A-D-C-F or F-C-D-A
(2) A-D-F-C or C-F-D-A
(3) D-A-C-F or F-C-A-D
(4) D-A-F-C or C-F-A-D

The second order in each case is merely the reverse of the first order. To determine which of these to choose, the original connections between the procedures are examined. First, the choices involving connections that did not exist in the original graph are eliminated. In particular, procedure F is connected neither to procedure A nor to procedure D in the original graph. Hence, possibilities (2) and (4) are eliminated. If there are any remaining choices, preference is given to the order that reflects the strength of the original ordering. For example, procedure C was more strongly connected to procedure A (weight of 4) in the original graph than to procedure D (weight of 3). Hence, it is preferred that C and A be adjacent in the final order, as long as the already determined groupings can be satisfied. Hence, the grouping D-A-C-F or its equivalent grouping F-C-A-D is preferred.

This process continues until the graph has no edges left. If the graph was a connected graph, then the final step will lead to a single node. If the graph was disjoint, then there will be several independent nodes. This later case can occur when a procedure is not called at all for the test data used to generate the graph.

There has been described herein a method for optimizing computer code. Various modifications to the present invention will become apparent to those skilled in the art from the foregoing description and accompanying drawings. Accordingly, the present invention is to be limited solely by the scope of the following claims.

What is claimed is:

1. A method for operating a digital computer, including a memory for the storage of computer instructions and data, to convert a first computer program to a second computer program, said first computer program comprising a set of basic blocks of computer code arranged in a first linear order and said second computer program comprising a second set of basic blocks in a second linear order, each basic block of said second set of basic blocks being derived from one of said basic blocks of said first set of basic blocks, said method comprising the steps of:

(a) determining the frequency with which each basic block of said first set of basic blocks transfers control to each other basic block of said first set of basic blocks when said first computer program is executed with test data;

(b) providing an indicator for each pair of said basic blocks of said first set of basic blocks having a determined transfer frequency greater than zero, each said indicator having a first state and a second state, each said indicator being initialized to said first state;

(c) determining which pair of basic blocks of said first set of basic blocks for which said indicator corresponding to said pair is in said first state has the largest transfer frequency and setting said indicator corresponding to said pair to said second state;

(d) combining a pair of chains of said first set of basic blocks to form a new chain which replaces said pair of chains if a source basic block for said pair of chains is the tail of one of said chains and a target basic block is the head of the other of said chains, said source basic block and target basic block being said pair of basic blocks determined in step (c);

(e) repeating steps (c) and (d) until all said indicators are in said second state; and (f) arranging said chains in a linear order to generate said second computer program.

2. The method of claim 1 wherein said step of arranging said chains in a linear order further comprises the step of placing a first one of said chains in front of a second one of said chains if said first chain contains the source of a conditional branch and said second chain contains the target of said conditional branch.

3. The method of claim 2 wherein said digital computer further comprises means for loading said second computer program into said computer memory at memory locations specified by labels in said second computer program and wherein said step of arranging said chains further comprises the step of placing the target basic block of each pair of chains combined in step (d) having a determined transfer frequency less than a predetermined value into a code segment separate from that containing the source basic block of said each pair of chains combined in step (d), and labeling said separate code segment in a manner that will cause said separate code segment to be placed in a specified area of computer memory when said second computer program is loaded into said digital computer prior to execution of said second computer program.

4. The method of claim 3 further comprising the step of converting a branch instruction ending said source basic block of one of said chains to a long branch instruction.

5. In a digital computer system including a computer memory, a method for causing said digital computer system to load a computer program comprising a plurality of procedures, wherein at least some of said procedures when executed by said computer system call others of said procedures, into said computer memory, said method comprising the steps of:

(a) determining the frequency with which each procedure calls each other procedure in said computer program; and (b) placing said procedures in said computer's memory in an order that depends on said determined frequencies, wherein said step of placing said procedures comprises the steps of:

(c) defining groups of said procedures, each group initially comprising one of said procedures, each group being defined as being determined or incompletely determined, said groups being initially defined to be incompletely determined;

(d) defining a weight for each pair of said groups, said weight initially being the determined frequency with which said procedure in one group of said each pair called said procedure in the other group of said each pair;

(e) combining a pair of said groups having the highest weight to form a new group which replaces each group in said pair of groups;

(f) determining an order for the procedures in said new group if one of the groups in said combined pair was defined as being incompletely determined, said new group being defined as being determined if an order is determined for all procedures in said new group, and being defined as incompletely determined otherwise;

(g) defining weight for each pair of groups containing said new group, is said weight being the sum of the frequencies with which said new group called the other group in said each pair of groups; and (h) repeating steps (e) through (g) until only one group remains, the order in which said procedures are loaded into said computer memory being determined by the order of said procedures in said remaining group.

6. The method of claim 5 wherein said step of determining an order for the procedures in a group which resulted from the combination of two groups in which one of said groups was defined as being incompletely determined and in which said combined groups includes at least three said procedures, said step of determining an order comprises the steps of:

constructing a list of all possible orderings of procedures in said new group group;

eliminating orderings in which a pair of procedures in which neither procedure calls the other are placed next to each other; and choosing one of said remaining orderings as the order for the procedures in said new group.

* * * * *

UNITED STATES PATENT AND TRADEMARK OFFICE
CERTIFICATE OF CORRECTION

PATENT NO. : 5,212,794
DATED : May 18, 1993
INVENTOR(S) : Karl W. Pettis et al.

It is certified that error appears in the above-identified patent and that said Letters Patent is hereby corrected as shown below:

Column 11,
Line 38, after "basic block of" insert -- said --

Column 12,
Line 42, delete "a" and insert therefor -- said new --

Signed and Sealed this

Eighth Day of March, 2005

JON W. DUDAS
*Director of the United States Patent and Trademark Office*